July 18, 1950     J. A. LAUBER     2,516,006

SPECTACLE FRAME

Filed Jan. 3, 1949

INVENTOR.
John A. Lauber
BY Harold E. Stonebraker
his Attorney

Patented July 18, 1950

2,516,006

UNITED STATES PATENT OFFICE 2,516,006

SPECTACLE FRAME

John A. Lauber, Rochester, N. Y., assignor to Continental Optical Company, Inc., Rochester, N. Y., a corporation of Indiana Application January 3, 1949, Serial No. 68,977

4 Claims. (Cl. 88—41)

This invention relates to a spectacle frame, with more particular reference to the type of construction in which the lenses are mounted in supporting arms each of which includes a vertical portion that overlies the front of the lens adjacent to its upper edge and a horizontal portion that conforms to and overlies the top edge of the lens, and it has for its purpose to afford an improved and novel construction that facilitates adjusting the temples in relation to the lenses to fit the wearer accurately.

Spectacles are generally provided with a lens strap or lens-supporting element that includes an end piece to which the temple is pivotally connected by a conventional hinge, such end pieces being usually of approximately square cross-section and of considerable thickness in both directions in order to impart strength and stiffness to the frame, and it is impossible to bend such an end piece to make the necessary adjustments without defacing the front and other surfaces of the end piece or damaging the lens because of the force that must be exerted with pliers to grip and bend the end piece in order to effect the desired adjustment of the temple in relation to the lens, and it is a particular purpose of this invention to afford a construction of end piece which provides the required stiffness and strength in the frame to hold the lenses rigidly while at the same time permitting any desirable bending or twisting of the end piece necessary to adjust the position of the temples so as to fit the wearer accurately and hold the lenses in exactly the desired position.

When adjusting a spectacle frame, it is usually necessary to bend the end pieces forwardly or rearwardly in relation to the plane of the lenses so as to move the temples away from or closer to the face of the wearer, and also to twist the end pieces about their longitudinal axes so as to move the rear ends of the temples upwardly or downwardly in relation to the plane of the lenses and thus change the angular relationship between the temple and the lenses, and it is a purpose of the invention to provide a lens-supporting arm, lens strap, or other lens-supporting element with a temple-connecting end piece that is constructed so as to permit the necessary adjustments of bending the end piece in a generally horizontal plane or twisting about its longitudinal axis without marring or defacing the surfaces of the end piece or otherwise detracting from its appearance, and also without breaking or damaging the lenses.

More specifically the invention has for its purpose to afford a spectacle frame with a lens-supporting arm having connected thereto an end piece that is of such thinness as to permit bending the same without imposing excessive pressure on or damaging the front face or other surfaces of the end piece as a result of engaging it with pliers, and of such width at its inner end where it is attached to the lens-supporting arm as to impart the required strength and rigidity to the frame to prevent accidental or unintentional bending of the end piece and to hold the lenses securely in their adjusted positions.

A further purpose of the invention is to afford, in conjunction with an end piece such as described above, a temple that may grip the face of the wearer with greater pressure than conventional metal temples while maintaining the proper degree of flexibility, and accomplishing this by means of an end piece that is of considerable width at its outer extremity where the temple is hingedly connected while the front end of the temple is of the same width as the outer extremity of the end piece, such widened portion of the temple being of considerable thinness and affording a vertically arranged relatively wide, thin, flat portion that has extreme flexibility and at the same tim exerts considerable pressure against the face of the wearer, thus enabling closer and more accurate adjustment of the temples in relation to the lenses.

To these and other ends, the invention consists in the construction and arrangement of parts that will appear clearly from the following description when read in conjunction with the accompanying drawings, the novel features being pointed out in the claims following the specification.

Figure 1:
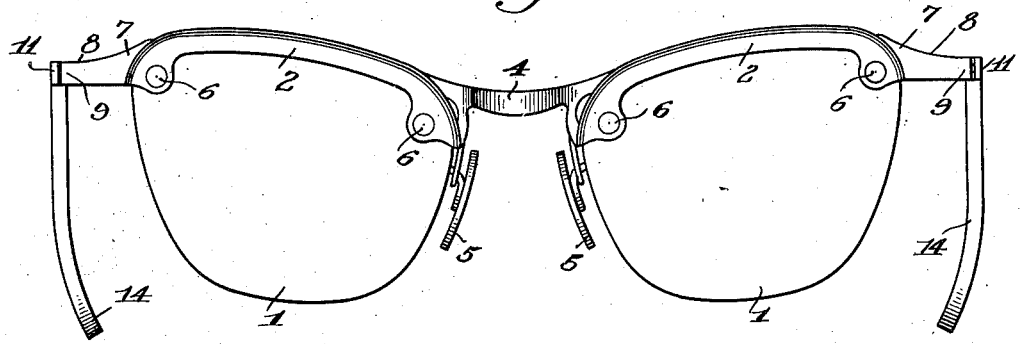
Fig. 1 is a view in front elevation of a spectacle frame with lenses attached showing a preferred embodiment of the invention.
Figure 4:
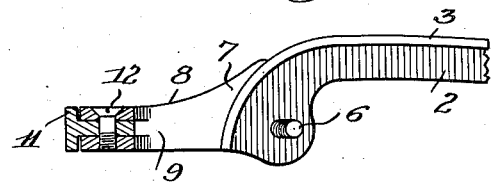
Fig. 4 is an enlarged detail sectional view on line 4—4 of Fig. 3 partially broken away and looking in the direction indicated, with the lens removed.
Figure 2:
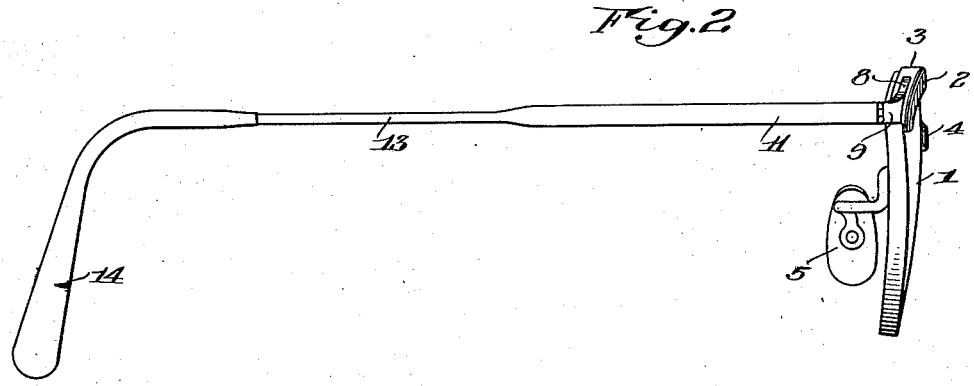
Fig. 2 is a view in side elevation of the same.

It will be understood that the invention may be embodied in conjunction with any lens-supporting element, and as illustrative of one practical application, there is shown a structure such as forms the subject matter of application Serial No. 46,995, filed August 31, 1948, now Patent No. 2,509,655, May 30, 1950. Referring more particularly to the drawings in which like reference numerals refer to the same parts throughout the several views, 1 designates the lenses, each of which is mounted in a lens-supporting arm that conforms to the upper edge of the lens and includes a front vertical portion 2 that overlies the upper portion of the front surface of the lens and a horizontal flange 3 that conforms to and overlies the top edge of the lens. 4 is a bridge portion connecting the lens-supporting arms 2, 5 are conventional nose pads, and 6 indicates the fastening devices for holding the lenses 1 onto the lens-supporting arms.

The structure thus far described is in accordance with the disclosure of the aforementioned application, the present invention being an improvement thereon, and it is to be understood that the bridge and supporting arms are preferably constructed of suitable metal, and when the lenses are secured to the supporting arms by their fastening devices, they are firmly attached and the frame serves to hold the lenses with extreme rigidity and firmness.

Each supporting arm is provided at its outer end with a metal end piece to which a temple is pivotally connected, and according to the present invention, the end piece includes an inner portion 7 that is of considerable width and conforms to the adjacent surface of the supporting arm top wall 3 and extends from the lower edge of the supporting arm to a point near its uppermost edge, such that the upper edge 8 of the end piece merges into and forms a continuous curve with the upper edge of the lens-supporting arm while the outer portion 9 of the end piece is of considerably greater width than the conventional spectacle frame end piece in order to impart the necessary strength and rigidity to the frame.

The outer extremity of the end piece is approximately 3/32" or more in width while the inner end of the end piece where it joins onto the lens-supporting arm has a width of approximately 3/16" or more, the upper edge of the end piece preferably tapering in a gradual curve from its wide inner end to its narrower outer end and having a bottom edge that extends outwardly in a straight line from the bottom edge of the lens-supporting arm.

Figure 3:
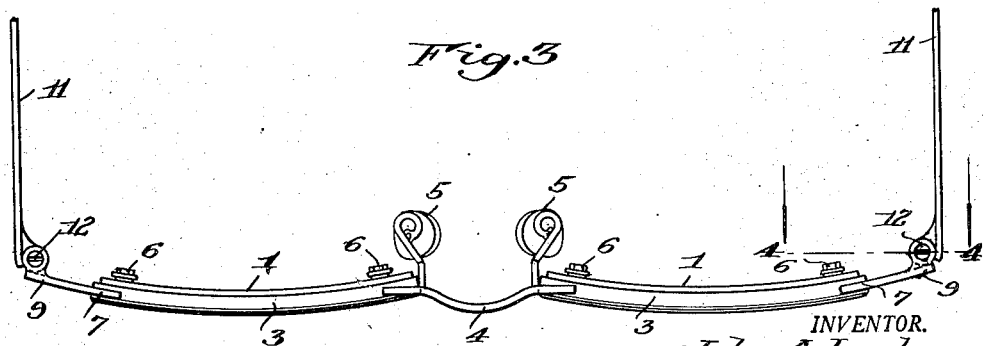
Fig. 3 is a top plan view partially broken away.

The end piece including both its inner wide portion 7 and its outer narrower portion 9 is relatively thin throughout to permit the necessary bending and twisting adjustments, and is preferably about 35/1000" or less in thickness, and the inner end of the end piece at its wide portion is attached to the adjacent surface 3 of the lens-supporting arm by welding, soldering, or otherwise suitably connecting its edge thereto at a point substantially midway between the inner and outer edges of said portion 3 of the lens-supporting arm, as shown in Fig. 3, so that while the end piece is of such thickness as to facilitate bending, its attachment to the lens-supporting arm intermediate the front and back edges of the latter and its extreme width at the point of attachment results in sufficient stiffness and strength in the frame, and as a consequence the lenses are held firmly after they are once adjusted and there is no likelihood of the end piece being unintentionally or accidentally bent, or their adjusted relationship otherwise changed after proper adjustment is once determined.

Each end piece is sufficiently thin so that it can be bent by the proper application of pliers to move the outer extremity of the end piece and the attached temple in a plane generally perpendicular to the plane occupied by the lenses, or to twist the end piece about its longitudinal axis so as to adjust the temple hinge and temple angularly and thus change the angular relationship between the temples and the lenses or to move the rear ends of the temples upwardly or downwardly in relation to the lenses, and these desired adjustments can be effected without marring or damaging the front face or other surfaces of the end piece or otherwise detracting from its efficiency, or in any way disturbing or affecting the lens in the supporting arm.

With the conventional metal temple, it is ofttimes difficult to obtain the proper position of the temples in relation to the face of the wearer and at the same time maintain the desired pressure of the temples so as to maintain the lenses in proper position, and this result is attained in the present structure by the provision of a metal temple having a relatively wide and thin forward portion 11 that is hinged to the end piece at 12, the wide portion 11 of the temple being vertically arranged and of the same width as the outer portion 9 of the end piece.

The forward portion 11 of the temple preferably has a thickness of about 1/64", thus affording a relatively wide, thin, flexible metal front portion that embraces the wearer's face with considerable yieldable pressure, while 13 designates the rear portion of the temple of conventional cross-section to which the ear portion 14 is connected at the back end. With this arrangement, the end pieces can be bent to bring the temples into just the proper relationship angularly and endwise of the lenses adjacent the face, and the wide, thin forward portions 11 of the temples act through their greater resistance and flexibility or resiliency to hold the temples firmly but yieldably against the face, so that a more accurate and at the same time more comfortable adjustment of the spectacle can be had.

While the invention has been described with reference to the particular structure herein shown, it is not confined to the exact details described, and this application is intended to cover such modifications or changes as may come within the purposes of the improvements or the scope of the following claims.

I claim:

1. In a spectacle frame, the combination with a metal lens-supporting element having a curved end portion conforming to and extending downwardly adjacent to the curved edge at the outer end of a lens, of a metal end piece having a curved inner end conforming to and rigidly connected to the side of said curved end portion of the lens-supporting element and extending from the bottom of said curved end portion upwardly along the side thereof, and a temple pivotally connected at the outer extremity of said end piece, said curved inner end of the end piece where it is attached to the side of said curved end portion of the lens-supporting element being approximately twice the width of the outer end of said end piece and the end piece having a thickness throughout of approximately less than one-half its width at its outer end, the upper edge of said end piece extending upwardly from its outer narrow end to its inner wide end where it merges into the adjacent surface of the lens-supporting element and the bottom edge of the end piece extending substantially in a generally horizontal direction away from the bottom of said curved end portion of the lens-supporting element.

2. In a spectacle frame, the combination with a metal lens-supporting element having a curved end portion conforming to and extending downwardly adjacent to the curved edge at the outer end of a lens, of a metal end piece having a curved inner end conforming to and rigidly connected to the side of said curved end portion of the lens-supporting element and extending from the bottom of said curved end portion upwardly along the side thereof, and a temple pivotally connected at the outer extremity of said end piece, said end piece having a minimum width at its outer end of approximately $\frac{3}{32}''$, a minimum width at its inner end of approximately $\frac{3}{16}''$, and a thickness throughout of less than one-half of its width at the outer end, the end piece having its bottom edge extending in a generally horizontal direction away from the bottom of said curved end portion of the lens-supporting element and its upper edge extending upwardly from its outer narrow end to its wide inner end where it merges into the adjacent surface of the lens-supporting element.

3. In a spectacle frame, the combination with a brace-bar type of lens-supporting element comprising rim sections of angle-iron cross-sectional shape extending in a direction longitudinally of the upper edges of the lenses and including curved end portions conforming to and extending downwardly adjacent to the curved edges at the outer ends of the lenses, said rim sections having depending vertical portions following substantially the upper contour of the edge portions of the lenses and overlying the upper portions of the faces of the lenses and angularly disposed lips following substantially the upper edges of the lenses and acting to cap the forward portions of the upper edges of the lenses, of metal end pieces having curved inner ends conforming to and rigidly connected to the sides of said curved end portions of the depending angularly disposed lips and extending from the bottoms of said lips upwardly along the sides thereof, and temples pivotally connected at the outer extremities of said end pieces, the curved inner end of each end piece where it is attached to the side of said lip being approximately twice its width at its outer end, each end piece having a thickness of approximately less than one-half its width at its outer end and a bottom edge extending in a generally horizontal direction away from the bottom of said lip and an upper edge extending upwardly from its narrow outer end to its wide inner end where it merges into the adjacent surface of said lip.

4. In a spectacle frame, the combination with a brace-bar type of lens-supporting element comprising rim sections of angle-iron cross-sectional shape extending in a direction longitudinally of the upper edges of the lenses and including curved end portions conforming to and extending downwardly adjacent to the curved edges at the outer ends of the lenses, said rim sections having depending vertical portions following substantially the upper contour of the edge portions of the lenses and overlying the upper portions of the faces of the lenses and angularly disposed lips following substantially the upper edges of the lenses and acting to cap the forward portions of the upper edges of the lenses, of metal end pieces having curved inner ends conforming to and rigidly connected to the sides of said curved end portions of the depending angularly disposed lips and extending from the bottoms of said lips upwardly along the sides thereof, and temples pivotally connected at the outer extremities of said end pieces, each end piece having a minimum width at its outer end of approximately $\frac{3}{32}''$, a minimum width at its inner end of approximately $\frac{3}{16}''$, and a thickness throughout of less than one-half its width at the outer end, the end piece having its bottom edge extending in a generally horizontal direction away from the bottom of said lip and having an upper edge that extends upwardly from its narrow outer end to its wide inner end where it merges into the adjacent surface of said lip.

JOHN A. LAUBER.

REFERENCES CITED

The following references are of record in the file of this patent:

UNITED STATES PATENTS

| Number | Name | Date |
| --- | --- | --- |
| 1,109,285 | Haase | Sept. 1, 1914 |
| 1,228,882 | Cook | June 5, 1917 |
| 1,843,496 | Schwab | Feb. 2, 1932 |
| 1,960,791 | Nerney | May 29, 1934 |
| 2,099,748 | Mertens | Nov. 23, 1937 |
| 2,211,084 | Styll | Aug. 13, 1940 |
| 2,384,815 | Cozzens | Sept. 18, 1945 |